United States Patent [19]
Lee et al.

[11] Patent Number: 5,551,313
[45] Date of Patent: Sep. 3, 1996

[54] AUTOMATIC TRANSMISSION SYSTEM FOR HEAVY CONSTRUCTION EQUIPMENT

[75] Inventors: Deok-Gyu Lee; Byung-Yun Huh, both of Kyung Nam, Rep. of Korea

[73] Assignee: Samsung Heavy Industry Co., Ltd., Rep. of Korea

[21] Appl. No.: 323,026

[22] Filed: Oct. 14, 1994

[30]     Foreign Application Priority Data

Mar. 31, 1994 [KR]   Rep. of Korea ................ 6726

[51] Int. Cl.⁶ ..................................... F16H 61/06
[52] U.S. Cl. ............................................ 74/336 R
[58] Field of Search ............................. 74/336 R

[56]          References Cited
          U.S. PATENT DOCUMENTS

| | | | |
|---|---|---|---|
| 3,939,722 | 2/1976 | Stromberg | 74/336 R |
| 4,140,031 | 2/1979 | Sibeud et al. | 74/336 R |
| 4,208,925 | 6/1980 | Miller et al. | 74/336 R |
| 4,301,689 | 11/1981 | Peppel | 74/336 R |
| 4,930,374 | 6/1990 | Simonyi et al. | 74/336 R |
| 5,353,662 | 10/1994 | Vaughters | 74/336 R |

*Primary Examiner*—Dirk Wright
*Attorney, Agent, or Firm*—Lieberman & Nowak

[57]          ABSTRACT

Disclosed is an automatic transmission system in which an ECU calculates change of the running speed to automatically shift the gears under optimal conditions. The automatic transmission system used for heavy construction equipment for variably changing a rotative speed of an output shaft by selectively engaging any one of a plurality of change gears according to the selection of oil passages of a solenoid valve includes a speed sensor for sensing the rotative speed of the output shaft or a running speed of the heavy construction equipment, a converter connected to the speed sensor, for converting a value sensed by the speed sensor into an electrical signal and a controller for receiving the electrical signal output from the converter and comparing the electrical signal with a pre-stored value, to apply a driving signal to the solenoid valve if the electrical signal is within a predetermined range, so as to shift gears.

6 Claims, 2 Drawing Sheets

1

AUTOMATIC TRANSMISSION SYSTEM FOR HEAVY CONSTRUCTION EQUIPMENT

BACKGROUND OF THE INVENTION

1. Field of the Invention

The present invention relates generally to automatic transmission system for heavy construction equipment and more particularly to automatic transmission systems in which an ECU (Electronic Control Unit) calculates change of the running speed to automatically shift gears under optimal conditions.

2. Description of the Prior Art

Semi-automatic transmission systems have generally been used for conventional heavy construction equipment. Such semi-automatic transmission systems, however, cause much inconvenience to the driver due to manually shifting gears in accordance with acceleration and deceleration of the vehicle.

Furthermore, heavy construction equipment commonly employs a two-speed transmission system having a first-speed (low-speed) gear and a second-speed (high-speed) gear. The ratio of the first-speed gear to the second-speed gear is about 6.876:1.80 and a ratio of the maximum running speeds thereof is about 9 Km/h:33.4 Km/h. Therefore, when shifting the gears, ill effects such as shocks may be caused.

In order to prevent the shocks when shifting gears and in particular, an overturn of the vehicle-body due to an abrupt speed reduction according to the gear ratio when shifting from high speed to low speed, and to save the expected life span of the transmission system, a governor should be employed which disallows the gear-shifting unless the running speed at a moment when down-shifting the gears from second-speed to first-speed reaches the maximum running speed range (9Km/h) of the first-speed gear. However, the employment of such a governor leads to very complicated hydraulic circuits.

Referring to FIG. 1, a conventional transmission system for heavy construction equipment must include a first-speed clutch 101 for engaging a first-speed gear, a second-speed dutch 102 for engaging a second-speed gear a control valve 103 for selectively supplying pressurized oil to the first-speed clutch 101 or the second-speed clutch 102 to shift the gears, a governor valve 104 and a reset valve 105 for preventing shocks upon shifting the gears.

The present invention is made to achieve a solution to the above-mentioned problems concerning the operation of the transmission and the complicated make-up of the flow circuit, the inventor underwent extensive research which resulted in the present invention.

SUMMARY OF THE INVENTION

It is therefore an object of the present invention to provide an automatic transmission system for calculating changes in the running speed using an ECU to automatically shift gears under optimal condition.

It is another object of the present invention to provide an automatic transmission system for preventing shocks due to a gear ratio difference, thereby smoothly shift gears in a two-speed transmission system for heavy construction equipment.

According to one aspect of the present invention, an automatic transmission system used for heavy construction equipment for variably changing the rotative speed of an output shaft by selectively engaging any one of a plurality of change gears according to the selection of oil passages of a solenoid valve comprises a speed sensor for sensing at least one of the rotative speed of said output shaft and a running speed of the equipment; a converter connected to said speed sensor, for converting a value sensed by said speed sensor into an electrical signal; and a controller for receiving the electrical signal output from said converter and comparing the electrical signal with a pre-stored value, to apply a driving signal to said solenoid valve if said electrical signal is within a predetermined range, so as to shift gears.

According to a preferable feature of the present invention, a flow rate controller is further installed in the oil passages on the way from the solenoid valve to the gears for relieving shocks when shifting gears.

BRIEF DESCRIPTION OF THE ACCOMPANYING DRAWINGS

These and other objects, features, and advantages of the present invention are better understood by reading the following detailed description of the invention, taken in conjunction with the accompanying drawings. In the drawings, it should be noted that elements are represented by corresponding symbols or reference numerals, wherein.

DETAILED DESCRIPTION OF THE PREFERRED EMBODIMENT

Figure 1:
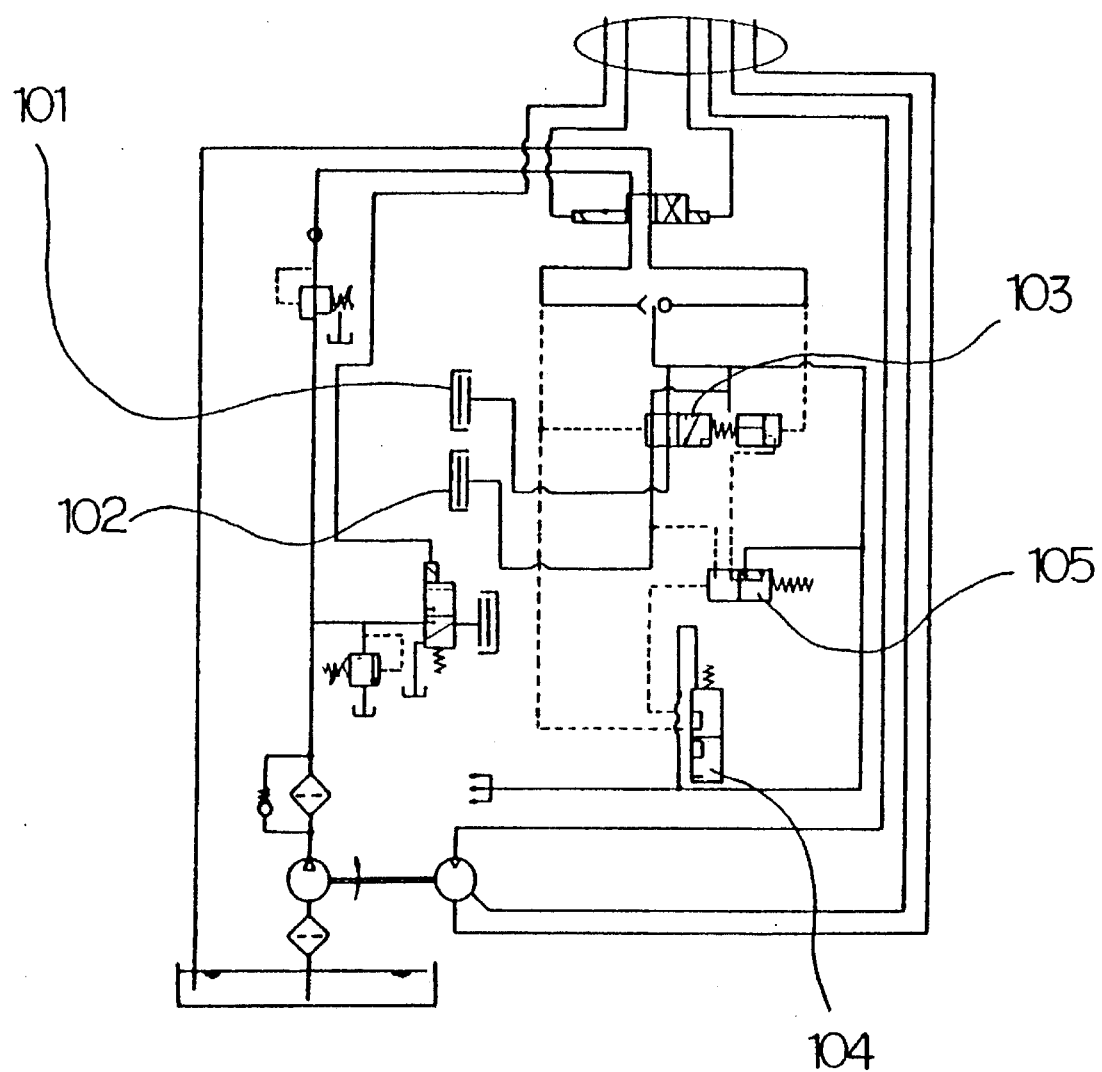
FIG. 1 shows a hydraulic circuit showing a conventional transmission system for heavy construction equipment.
Figure 2:
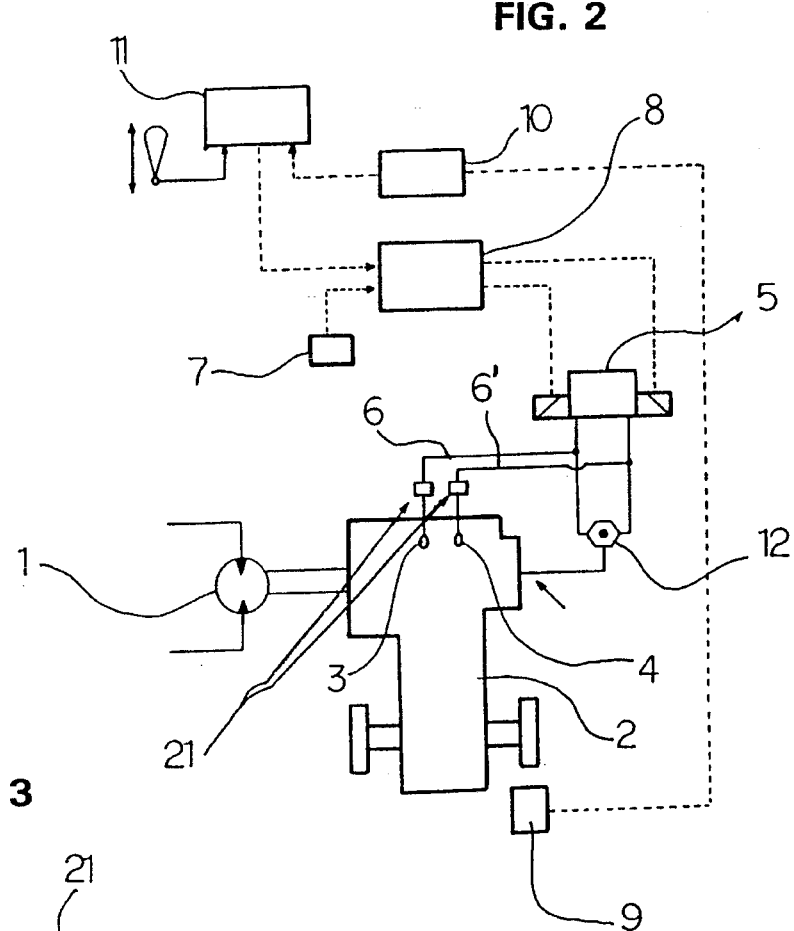
FIG. 2 shows a hydraulic circuit showing an automatic transmission system for heavy construction equipment according to the present invention.

FIG. 2 shows a schematic diagram of an automatic transmission system according to the present invention wherein the solid lines represent hydraulic lines showing the flow of pressurized oil and the dotted lines represent electrical wires showing the flow of electrical signals.

As shown in FIG. 2, a first-speed clutch 3 for engaging the first-speed gear and a second-speed clutch 4 for engaging the second-speed gear are installed in a transmission 2 driven by a hydraulic motor 1. Both the first-speed clutch 3 and the second-speed dutch 4 are engaged by the supply of pressurized oil. The first-speed dutch 3 and the second-speed clutch 4 are connected to a solenoid valve 5 by oil passages 6 and 6', respectively. The solenoid valve 5 selectively switches the oil passages to the first-speed clutch 3 and the second-speed clutch 4 by the movement of a spool in response to an electrical signal. The solenoid valve 5 is also electrically connected to a driving unit 8 which provides the solenoid valve 5 with an operating current supplied from a power supply 7.

Further, a speed sensor 9 for detecting the running speed continuously is connected to an output shaft of the transmission 2. A converter 10 is connected to the speed sensor 9 to convert the running speed value detected by the speed sensor 9 into an equivalent electrical signal. The converter 10 is then connected to an ECU 11. The ECU 11 receives the electrical signal from the convertor 10 and compares it with a pre-stored gear shiftable speed value. As a result, if the running speed is within a range of the gear shiftable value (for example, at the first-speed, the maximum rotative speed: 500 rpm to 600 rpm, or the maximum running speed: about 9 Km/h), the ECU 11 judges that the running speed is in a gear shiftable condition and provides the driving unit 8 with a gear shift command signal. Then, the driving unit 8 applies the operating current to the solenoid valve 5 from the power supply 7, so as to shift the gears b supplying the pressurized oil either to the first-speed clutch 3 or to the second-speed clutch 4. A reference numeral 12 represents a lubricating oil supply which is opened all the time to supply the transmission 2 with lubricating oil under a predetermined pressure (for example, about 2 bar) from the solenoid valve 5.

Further, flow rate controller 21 for relieving shocks when shifting gears are installed in the oil passages 6, 6'. The detailed construction and operation of the flow rate controller 21 will be described later.

The operation of the automatic transmission system according to the present invention is explained hereinbelow.

When the vehicle is started by the driving unit the speed sensor 9 detects the running speed continuously and the detected running speed value is converted by the converter 10 into an electrical signal to be applied to the ECU 11. Thereafter, if the running speed increases to reach the maximum running speed range of the first-speed gear, the ECU 11 judges it as the gear shiftable state and applies the gear shift command signal to the driving unit 8. Then, the driving unit 8 applies the operating current to the solenoid valve 5. Further, the solenoid valve 5 provides the second-speed clutch 4 with the pressurized oil by the movement of the spool so as to shift up the gears from the first-speed to the second-speed.

Alternatively, if the running speed running in the second-speed gear decreases to reach the maximum running speed range of the first-speed gear, the ECU 11 judges it as the gear shiftable state and applies the gear shift command signal to the driving unit 8. Then, the driving unit 8 applies the operating current to the solenoid valve 5. Further, the solenoid valve 5 supplies the pressurized oil to the first-speed clutch 3 by the movement of the spool so as to shift down the gears from the second-speed to the first-speed.

The shocks caused by shifting gears from first-speed to the second-speed and vice versa, are absorbed by the flow rate controller 21. The detailed structure of the flow rate controller 21 will be explained with reference to FIG. 3.

Figure 3:
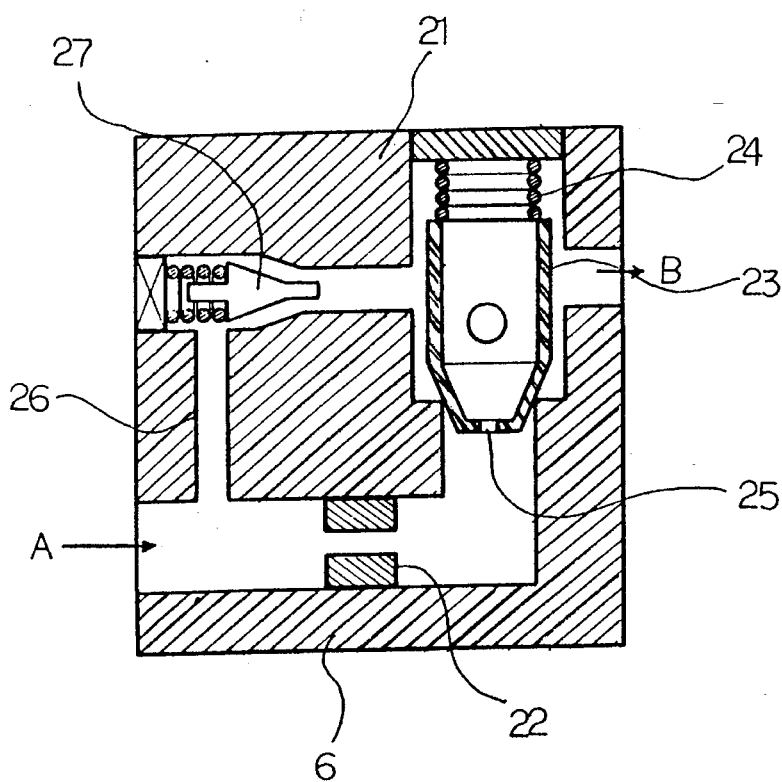
FIG. 3 is a schematic diagram showing a flow rate controller of the automatic transmission system for heavy construction equipment according to the present invention.

As shown in FIG. 3, the flow rate controller 21 includes a fixed orifice 22 and a popper valve 23 connected in series. In detail, the fixed orifice 22 and the popper valve 23 are installed in series in the oil passages 6, 6' extending from the solenoid valve 5 to the respective clutches 3 and 4. In the drawing, direction A represents the solenoid valve side 5 and direction "B" represents the respective clutch sides 3 and 4.

When the solenoid valve 5 is opened while shifting gears, the pressurized oil passes through the fixed orifice 22 and the poppet valve 23 of the flow rate controller 21 so that pressure is reduced and shocks are relieved before the pressurized oil is supplied to either one of the clutches 3 and 4 through oil passages 6 and 6'. At the beginning of the oil flow, since the pressure difference between the front and rear of the popper valve 9,3 is large, the popper valve 23 is widely opened. At this moment, the flow rate is mainly controlled by the fixed orifice 22.

As the pressure difference between the front and rear of the popper valve 23 is gradually reduced, the popper valve 23 is closed by the elastic restoring force of the spring 24. At this moment, the poppet valve 23 mainly controls the flow rate. The flow rate immediately before clutch 3 or clutch 4 is engaged becomes very small. However, as the pressure difference between the front and rear of the poppet valve 23 becomes smaller, the popper valve 23 is more firmly closed, which is freely controllable by adjusting the elastic modules of the spring 24.

However, the pressurized oil supply may be undesirably cut off before the pressure reaches an appropriate pressure for firmly engaging clutch 3 or 4 due to the operation of the popper valve 23. It is therefore preferable, as shown in FIG. 3, to form an equilibrium orifice 25 piercing through the inside and outside of the popper valve 23 and to form a bypass oil passage 26 so as to return the oil flow into the popper valve 23 through the equilibrium orifice 25 back to the oil passage 6 positioned before the fixed orifice 22. Further, a check valve 27 is installed in the bypass oil passage 26 to prevent the counterflow of the pressurized oil.

By the flow rate controller 21 structured as described above, the shocks due to the pressurized oil supplied from the solenoid valve 5 while shifting gears and the various ill effects caused by the shocks may be completely removed.

As described heretofore, according to the present invention, the ECU calculates the change of the running speed and shifts the gears automatically under optimal condition, thereby improving the driver's convenience. Furthermore, since the complicated parts such as the governor is not necessary, the hydraulic circuit is drastically simplified. In particular, the shocks occurring in a two-speed transmission system for heavy construction equipment are relieved so that all the problems including the vibration and the noise generation caused by the shocks may be completely solved, and a more smooth gear shift operation is achieved.

What is claimed is:

1. An automatic transmission system for heavy construction equipment for changing the rotative speed of an output shaft by selectively engaging any one of a plurality of change gears according to the selection of oil passages of a solenoid valve comprising:

a speed sensor for sensing at least one of the rotative speed of said output shaft and the running speed of the equipment;

a converter connected to said speed sensor, for converting a value sensed by said speed sensor into an electrical signal which represents the speed sensed by the speed sensor;

a controller for receiving the electrical signal output from said converter and comparing the electrical signal with a predetermined stored value, to apply a driving signal to said solenoid valve if said electrical signal received from said sensor, which represents the speed sensed by the speed sensor, is within a predetermined range, so as to shift gears; and a flow rate controller installed in said oil passages between said solenoid and said gears, for relieving shocks when shifting gears, said flow rate controller having a fixed orifice and a poppet valve respectively installed in series in the oil passages.

2. An automatic transmission system for heavy construction equipment as claimed in claim 1 wherein said transmission system comprises a two-speed transmission having a first-speed gear and a second-speed gear, wherein said predetermined range is a maximum running speed range at said first-speed gear.

3. An automatic transmission system for heavy construction equipment as claimed in claim 2, wherein said predetermined range is between 500 rpm and 600 rpm.

4. An automatic transmission system used for heavy construction equipment as claimed in claim 1 further comprising:

an equilibrium orifice formed piercing through the inside and the outside of said popper valve;

a bypass oil passage for returning pressurized oil that has flowed into said popper valve through said equilibrium orifice to the oil passage positioned prior to said fixed orifice; and a check valve installed in said bypass oil passage, for preventing counter flow of the pressurized oil.

5. An automatic transmission system for heavy construction equipment as claimed in claim 4, wherein said transmission system comprises a two speed transmission having a first speed gear and a second speed gear, and wherein the predetermined range is the maximum running speed range at said first speed gear.

6. An automatic transmission system for heavy construction equipment as claimed in claim 4, wherein said predetermined range is between 500 and 600 rpm.

* * * * *